United States Patent
Ballare

[11] Patent Number: 5,581,788
[45] Date of Patent: Dec. 3, 1996

[54] SYSTEM FOR TESTING THE FUNCTIONALITY OF VIDEO CORD AND MONITOR BY USING PROGRAM TO ENABLE USER TO VIEW LIST OF MODES AND SELECT COMPATIBLE MODE

[75] Inventor: Daniel E. Ballare, Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 535,364

[22] Filed: Sep. 28, 1995

Related U.S. Application Data

[63] Continuation of Ser. No. 990,994, Dec. 14, 1992, abandoned.

[51] Int. Cl.⁶ .................................................... G06F 15/02
[52] U.S. Cl. ...................... 395/834; 395/500; 364/237.2; 364/239.4; 364/264
[58] Field of Search ................................ 395/500, 700, 395/821, 822, 828, 834, 835, 836, 112, 162; 345/132, 153, 155

[56] References Cited

U.S. PATENT DOCUMENTS

| | | | |
|---|---|---|---|
| 5,072,411 | 12/1991 | Yamaki | 395/162 |
| 5,083,121 | 1/1992 | Nomura et al. | 345/200 |
| 5,153,886 | 10/1992 | Tuttle | 371/67.1 |
| 5,193,174 | 3/1993 | Bealkowski et al. | 395/500 |
| 5,225,822 | 7/1993 | Shiraishi et al. | 345/102 |
| 5,226,160 | 7/1993 | Waldron et al. | 395/650 |
| 5,257,350 | 10/1993 | Howard et al. | 395/162 |
| 5,276,458 | 1/1994 | Sawdon | 395/112 |
| 5,315,314 | 5/1994 | Harrison et al. | 345/186 |
| 5,327,530 | 7/1994 | Bae | 395/162 |
| 5,349,661 | 9/1994 | Brewer et al. | 395/700 |
| 5,375,210 | 12/1994 | Monnes et al. | 395/162 |
| 5,377,317 | 12/1994 | Bates et al. | 395/157 |

OTHER PUBLICATIONS

"High-resolution Colour monitors", Nov. 6, 1991, PC User, n. 171, p. 150(7).
"Communications and Video setup with SETMODE", by Kihlken, Tom, Jul. 88, PC Magazine, V7, n. 13, p. 351 (13).
"Orchid ProDesigner Plus", by Moralee, Dennis, Mar. 90, 3D, n23, p. 39(2).

*Primary Examiner*—Thomas C. Lee
*Assistant Examiner*—Moustafa Mohamed Meky
*Attorney, Agent, or Firm*—Wayne P. Bailey; David F. Zinger

[57] ABSTRACT

A system and method for testing the functionality of a VGA card and associated monitor. A testing and set up tool or Program is installed in a computer having an operating system. The Program provides a list of modes and timings for a plurality of monitors including the monitor being tested as part of the computer. A user of the Program selects various modes and timings to be tried. Looking at the screen of the monitor enables the user to determine which combinations of modes and timings, for example, are successful. A list is maintained for the modes and timings that prove successful or compatible. The list for compatible combinations is passed to the driver associated with the operating system of the computer. In a DOS environment, for example, the list of compatible combinations is used by the Program to write a Command Line that is used for setting up the associated CONFIG.SYS.

12 Claims, 3 Drawing Sheets

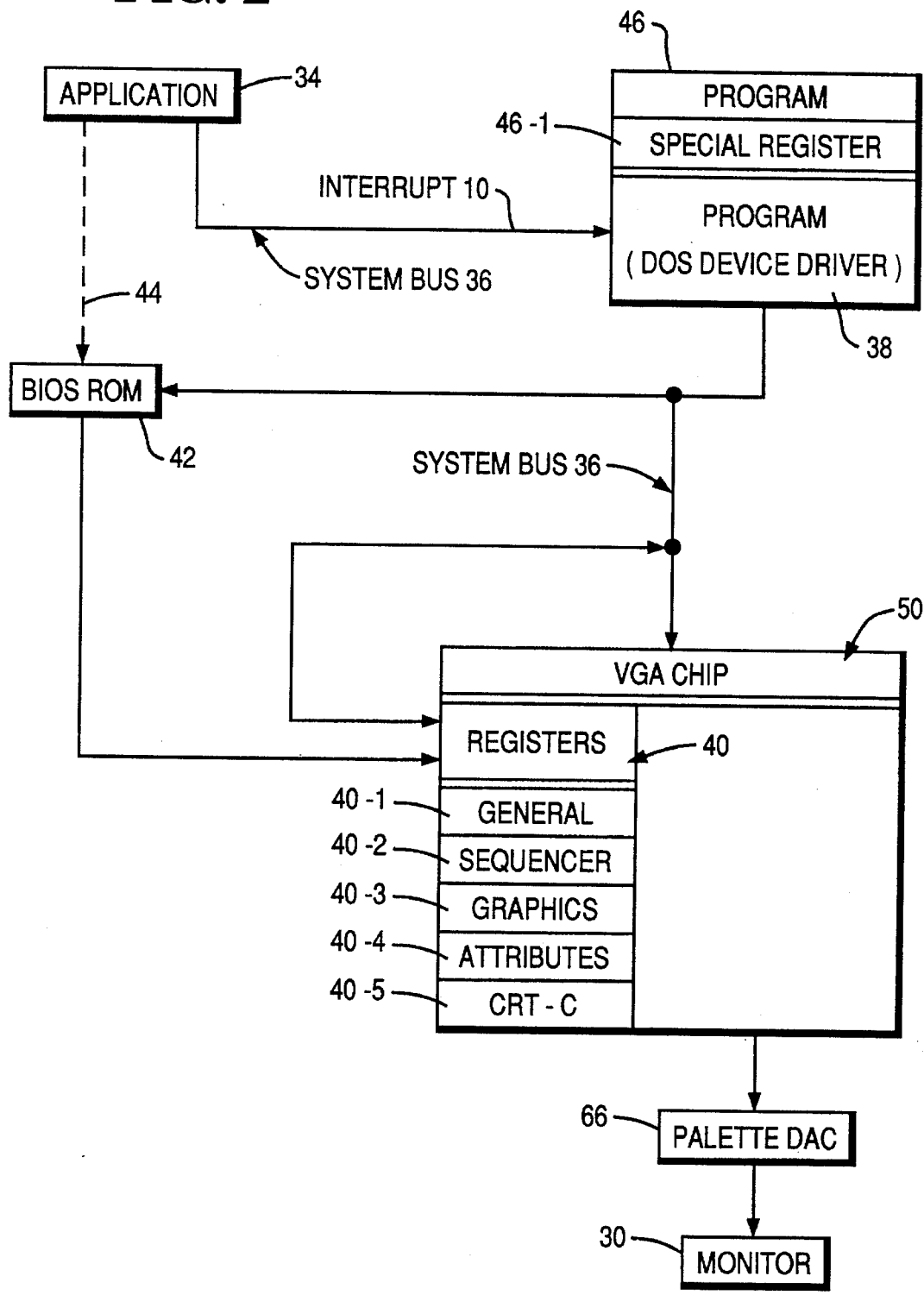

SYSTEM FOR TESTING THE FUNCTIONALITY OF VIDEO CORD AND MONITOR BY USING PROGRAM TO ENABLE USER TO VIEW LIST OF MODES AND SELECT COMPATIBLE MODE

This is a continuation of application Ser. No. 07/990,994 filed Dec. 14, 1992, now abandoned.

BACKGROUND OF THE INVENTION

1. Field of Invention

This invention relates to a user-friendly system and method for quickly verifying the functionality of a VGA card installed in a computer in relation to a monitor used with the computer.

2. Background Information

When a user installs a VGA card, for example, into a personal computer, there is generally no way for quickly verifying the functionality of the card in relation to the particular monitor that is used in conjunction with the personal computer or PC. The VGA card presents several modes and timings that have to be set for the particular monitor being used in order to have the monitor function properly. Very often in a general installation procedure, a user may select modes and timings which result in a blank screen on the monitor, with the user not knowing what is the problem.

SUMMARY OF THE INVENTION

An object of this invention is to provide a user-friendly system and method for verifying which timings work best for a VGA board and an associated monitor.

Another object of this invention is to provide a command set up utility or tool that can be used to provide a "command line" that is turned over to a software driver like a DOS Device Driver, for example.

In a first aspect of this invention, there is provided a method of verifying the functionality of a video graphics adapter (VGA) card and a monitor that are installed in a computer having an operating system, comprising the steps of:

(a) installing a testing and set up tool, hereinafter referred to as Program, in said computer;

(b) providing via said Program a list of modes and associated timings to be selected by a user of said Program relative to said monitor;

(c) selecting a timing for a mode presented from said list;

(d) checking the screen of the monitor to determine if the timing selected at step (c) is compatible with said monitor;

(e) selecting another timing, if necessary, from said list to find a timing which is compatible with said mode selected from step (c);

(f) maintaining a list of timings which are compatible with said monitor; and (g) passing the list of timings from step (f) to a device driver associated with said operating system to which said monitor is coupled.

In another aspect of this invention, there is provided a system comprising:

a computer having a video graphics adapter (VGA) card, a monitor, and an operating system;

a device driver for said operating system;

a testing and setup tool, hereinafter referred to as Program;

said Program being loaded in said computer and being effective to provide a list of modes and timings for a variety of monitors, including said monitor;

entry means enabling a user of said Program to select a mode and timing for said monitor;

said Program using said mode and timing selected to enable a user of said system to view said monitor to determine whether said mode and timing selected are operative for said monitor; and said Program having means for writing said mode and timing to said device driver.

The above advantages, and others, will be more readily understood in connection with the following specification, claims, and drawing.

BRIEF DESCRIPTION OF THE DRAWING

FIG. 2 is a schematic diagram, in block form, showing an environment in which the method of this invention may be used.

FIG. 3 is a listing showing one of the files in a DOS system.

DETAILED DESCRIPTION OF THE PREFERRED EMBODIMENT

Figure 1:
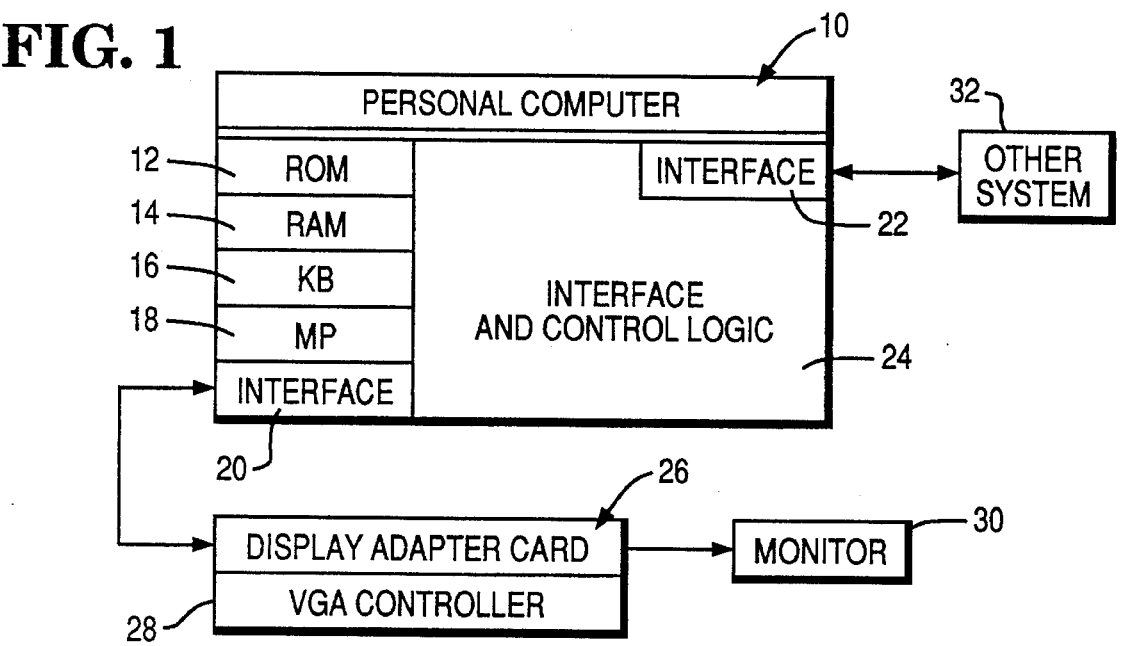
FIG. 1 is a schematic diagram, in block form, showing a personal computer, for example, an associated monitor, and a display adapter card that may be inserted into the personal computer.

FIG. 1 shows a personal computer or PC 10, for example, in which the method of this invention may be used. The PC 10 is a conventional PC, and it includes a ROM 12, a RAM 14, keyboard (KB) 16, a microprocessor (MP) 18, and interfaces 20 and 22, with all these components mentioned being interconnected by interface and control logic 24 to enable the PC 10 to operate in a conventional manner. The actual form of the PC 10 is different from that shown in FIG. 1; however, the form shown in FIG. 1 is used to show the functional relationships among the various elements mentioned.

The PC 10 has a display adapter card 26 that is coupled to the PC 10 through the interface 20. The display adapter card 26 may be plugged into the "motherboard" of the PC 10 or it may exist as a separate unit, and this card 26 has a VGA controller 28 thereon. The output of the display adapter card 26 is fed into a monitor 30. The PC 10 may also be coupled to some other system 32 via the interface 22.

As previously stated, when a user installs a VGA card into a PC, for example, there was generally no way for quickly verifying the functionality of the card in relation to the particular monitor that was used with the PC. With a plurality of PCs, video controller boards, and monitors, it is difficult for a user to determine which combination of such elements presents the user with the best combination of results. Very often in a general installation procedure, a user may select certain modes and timings from the video controller board which result in blank screens on the monitor.

Before discussing this invention in more detail, it appears appropriate to provide some background related to displaying data on a monitor. In this regard, FIG. 2 shows an environment in which the present invention may be used, with FIG. 2 showing some additional elements included in the display adapter card 26 shown in FIG. 1. When an application 34 is to be run on the PC 10, an Interrupt 10h or 10hex passing over the system bus 36 is used by a DOS Device Driver, which is referred to as Driver 38. Some of the industry standard display controllers such as VGA (video graphics array) are programmable devices which program different values into the registers 40 that are generally stored in the BIOS (Basic Input Output System) ROM 42. In the industry standard display controllers, the BIOS ROM 42 is called from the application 34 directly as shown by the dashed bus 44. The register values for the various display formats were stored in the BIOS ROM 42 that contained the machine code to support the video functions calls or modes (via Interrupt 10h) of the operating system, like DOS, for example.

Under the standard systems, as more and more modes of operation appeared, the register values for these new modes were also stored in the BIOS ROM 42. There are two general disadvantages with these systems. In general, the code space in the BIOS ROM 42 is limited to 32K bytes for the DOS operated PCs. Another disadvantage of the BIOS storage of mode values is that each screen format has a single mode number that is called by the application or application driver. This results in only one version of that mode being displayable unless some external method of selecting an alternate version of the mode is provided.

Driver 38 is a DOS device driver that is a development of the assignee of the present application and is currently available from NCR Corporation. Driver 38 is a driver that permits the alteration of register values for display formats or modes without altering the standard model for applications programs and drivers. Driver 38 allows many display formats to be supported without exceeding the standard 32K size allotted for the VGA BIOS. In addition, Driver 38 enables a display system to support a wide range of monitors, plus it enables the use of enhanced capabilities of the monitors for standard modes. In effect, Driver 38 screens all the interrupt 10h calls coming from the application 34 and adjusts or tailors them so as to obtain maximum flexibility out of the components that are in the system. Driver 38 handles multiple timings and it also sets up display modes that do not have values specified in BIOS. Driver 38 also responds to extended BIOS calls like those defined by VESA, the Video Elect Standards Association.

As stated earlier herein, an object of this invention is to provide a user friendly system and method for testing or verifying which timings work best for a VGA board and an associated monitor. Another object is to provide a command set up utility or tool that can be used to provide a "command line" that is turned over to a software driver like a DOS Device Driver, for example. This invention relates to a method that is embodied in a method or routine that is referred to as Program 46, as shown in FIG. 2. Program 46 is installed in the PC 10 and works in conjunction with Driver 38. Program 46 is used to determine the timings and other parameters, as will be described hereinafter, and forwards them to Driver 38 that is used to set the appropriate registers 40 in the BIOS ROM 42 and write this data into the CONFIG.SYS file. After installation, whenever there is an Interrupt 10h, Driver 38 would then set the appropriate registers 40 that were selected by Program 46.

The VGA registers 40 (FIG. 2) alluded to earlier herein are: (1) General registers 40-1; (2) Sequencer registers 40-2; (3) Graphics registers 40-3; (4) Attributes registers 40-4; and (5) CRT C registers 40-5. The General registers 40-1 handle the clocks and some of the interface control. The Sequencer registers 40-2 determine how memory is accessed by the CPU. The Graphics registers 40-3 determine how data is accessed from the display memory and sent to the Attributes registers 40-4. The Attributes registers 40-4 have recorded in them how the data should be recorded in colors on the screen of the monitor 30. And finally, the CRT-C registers 40-5 control the timing of data sent to the monitor 30. Because these registers 40, per se, may be conventional, they need not be described in any more detail.

Figure 4:
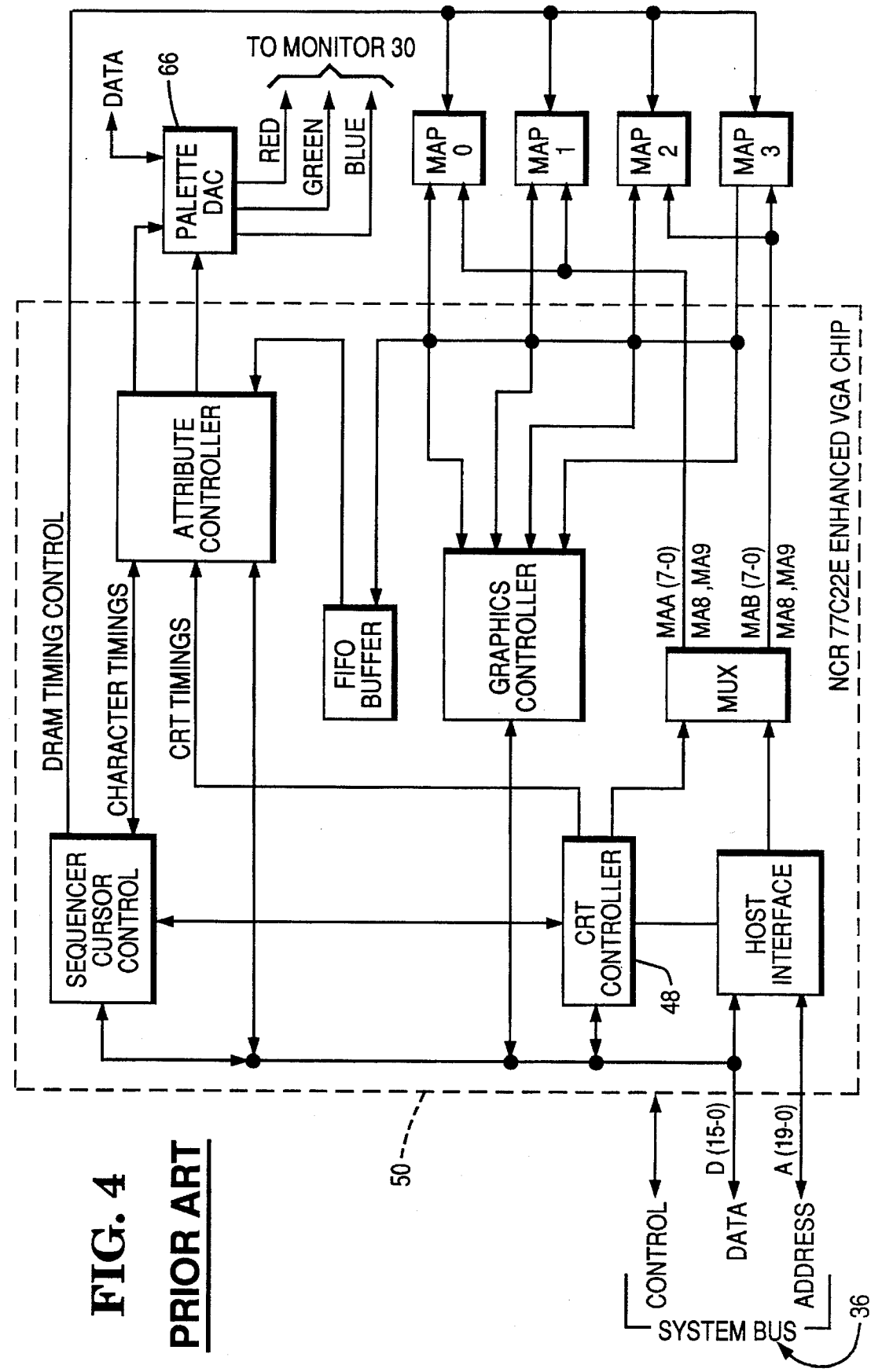
FIG. 4 is a schematic diagram of a currently-available, enhanced VGA chip.

Chart #1, which is included at the end of the specification, shows the data from the CRT C registers 40-5 (FIG. 2) which are used by a CRT controller 48 shown in FIG. 4. The CRT controller 48 is part of a currently-available, enhanced VGA chip (shown in the dashed outline as chip 50 and as NCR 77C22E) which is available from NCR Corp. Because this chip 50 is available, it need not be described in any further detail. The data shown in Chart #1 is part of a standard IBM CRT controller for producing standard VGA Modes; however, there is no one entry in Chart #1 that will provide all the necessary data to effect operation of a standard Mode. Chart #2, which is also presented at the end of the specification, shows a variety of different information as follows. The top line shows a Mode Setting and Screen, with Screen indicating the number of pixels and colors associated with the particular screen, like 640×480, 16 colors. The next line for the particular Mode Setting shows a 1st Timing in Hz that relates to a scanning or vertical refresh rate and a 2nd Timing in KHz that relates to the horizontal scanning rate. The Pixel Clock is given in MHz. The various Mode Settings shown in Chart #2 are the ones that are selected by the process of this invention. The Timings that are represented by the Mode Settings in Chart #2 are installed in some of the CRT-C registers shown in Chart #1 and other registers by Driver 38.

Figure 5:
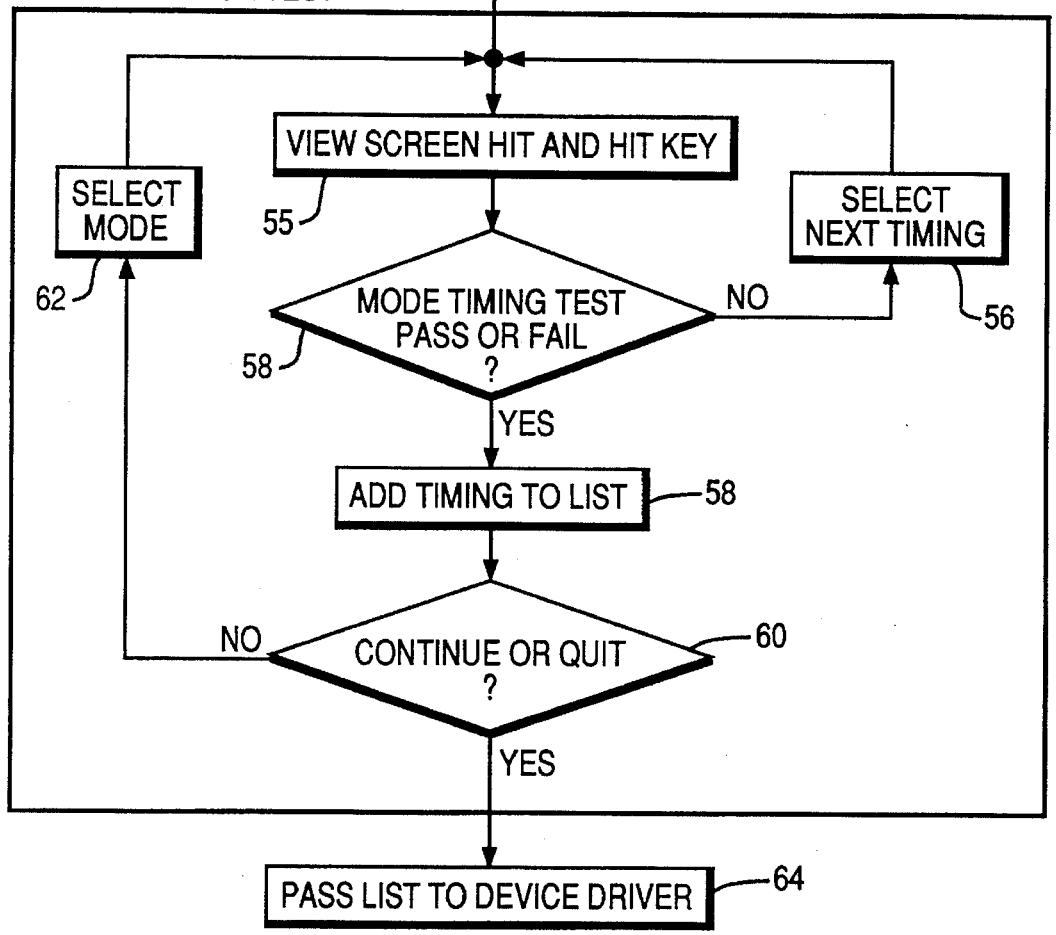
FIG. 5 is a flow chart showing the method according to this invention.

FIG. 5 is a flow chart showing the method according to this invention that is referred to as Program 46. As a start of Program 46, the user installs a VGA card and the associated software as shown in the block or step 52. The VGA card is the card 26 alluded to earlier herein with regard to FIG. 1. The user controls Program 46 by interacting with what is displayed on the monitor 30 and by actuating the appropriate keys on the KB 16 of the PC 10. After some conventional housekeeping activities by Program 46, the user is presented with an array of choices as are shown, for example, in Chart #2. Program 46 may start out with the first Mode 12h on the Chart #2 so as to get the user started. The user then selects the timing by selecting the Setting # which occurs in the last column of Chart #2. In general, the settings are arranged with the fastest timing for the associated mode being shown first in the Chart #2, with slower timings, where available, being shown after the fastest timing. In general, for the best performance, it is usually preferred to select the fastest timing which the associated combination of display adapter card 26, associated monitor 30, and PC 10 will provide. In some situations in which "motion" is to be displayed on the monitor 30, it may be advantageous to select less than the fastest timing so as to present a "blurred effect" to give the appearance of motion.

After a user selects a timing or Setting # for the associated Mode appearing on the monitor 30, Program 46 loads the appropriate data in the CRT C registers shown in Chart #1 along with any other data that has to be loaded in any other special registers (shown schematically as 46-1 in FIG. 2) to effect the timing selected. After the selection, the Enter key, for example, may be actuated to effect the test for the mode and timing selected. The user then looks at the screen of the monitor 30 (as at step 54 in FIG. 5) to determine whether or not the particular mode and timing selected can be obtained from the combination of elements in the system. If the screen of the monitor 30 is blank, it generally means that the fastest timings that were-first selected are not supported by system including the monitor 30.

If the screen of the monitor is blank at step 55 in FIG. 5, the user then selects the next timing (Setting #17 in the example being described) at step 56. and repeats the test at step 54. Assume that this slower timing (Setting #17) produces a satisfactory setting for the monitor 30 at step 55. The screen on the monitor 30 asks the user, at step 58, whether the user wants this particular timing to be added to the list of timings to be passed to the DOS Device Driver or Driver 38. At step 60, Program 46 asks the user if the user wishes to continue or quit the process.

If the user wishes to continue from step 60, Program 46 asks the user to select another Mode from Chart #2 as shown at step 62. The process described is repeated for selecting the timing that works for the Mode selected. Program also provides an option for users who are not too familiar with the techniques mentioned. This option is presented on the screen of the monitor 30 to select, for example, Option A that is to select all the Modes. In effect, Program 46 runs through all the various Modes and timings available, starting at the fastest timing and working down to the slowest timing.

When the user wishes to quit the procedure for selecting the timings for the various Modes presented, the user may instruct Program 46 to quit at step 60. Upon making this selection, Program 46 passes the list of timings to the DOS Device Driver or Driver 38 in the example being described, as shown by step 64 in FIG. 5. In effect, Program 46 is not only a testing facility, but it also is a set up tool. In this regard, Program 46 generates a Command Line as a result of the evaluations and the timings that have been passed to Driver 38. Such a Command Line is shown in FIG. 3 and is used in setting up the CONFIG.SYS file in a DOS system, for example. The various Settings that were selected at step 58 in FIG. 5 are shown as "13, 17, and 110" in FIG. 3.

As stated earlier herein, whenever the application 34 provides an interrupt 10h on the system bus 36, as shown in FIG. 2, Driver 38 utilizes the Interrupt 10h signal to set up the appropriate registers 40 and the special registers 46-1 to enable the monitor 30 to perform as selected. An additional feature of the present method, Program 46, is that it enables a user to run through all the timings and determine whether or not a particular combination of modes and timings will work. Program 46 is also very user friendly in establishing a Command Line as indicated in FIG. 3.

Another advantage of Program 46 is that it provides feedback in trouble shooting. For example, if there is no image on the screen of the monitor 30, it generally means that too fast a timing has been selected by the user. If the picture on the monitor 30 is fuzzy or "jiggly" (jumping), it generally means that the monitor can't synchronize to the data coming out. If the images on the monitor 30 are too red, for example, it may mean that the palette DAC 64 (D/A Converter) to which the VGA chip 50 writes is not the proper type. While this routine or Program 46 has been described in relation to a DOS environment, the techniques of this invention may be extended or written to OS2 and UNIX environments, for example.

CHART #1

CRTC REGISTERS

CRTC Address Register
Reader/Write 3x4
(0–4)  CRTC Register Index
(5)    Test (must be 0)
(6–7)  Reserved - 0
Horizontal Total Register
Read/Write 3x5 Index 0
(0–7)  Horizontal Total - 5
Horizontal Display Enable End Register
Read/Write 3x5 Index 1
(0–7)  Horizontal Display Enable Eng - 5
Start Horizontal Blanking Register
Read/Write 3x5 Index 2
(0–7)  Start Horizontal Blanking
End Horizontal Blanking Register
Read/Write 3x5 Index 3
(0–4)  End Horizontal Blanking LS 5 bits
       (SHB reg + width of blanking = 6 bit EHB value)
(5–6)  Display Enable Skew
(7)    Test (must be 1)
Start Horizontal Retrace Pulse Register
Read/Write 3x5 Index 4
(0–4)  Start Horizontal Retrace
End Horizontal Retrace Register
Read/Write 3x5 Index 5
(0–4)  End Horizontal Retrace LS 5 bits
(5–6)  Horizontal Retrace Delay
(7)    End Horizontal Blanking Bit 5
Vertical Total Register
Read/Write 3x5 Index 6
(0–7)  Vertical Total - 2 LS 8 bits
Overflow Register
Read/Write 3x5 Index 7
(0)    Vertical Total bit 8
(1)    Vertical Display Enable End bit 8
(2)    Vertical Retrace Start bit 8
(3)    Start Vertical Blank bit 8
(4)    Line Compare bit 8
(5)    Vertical Total bit 9
(6)    Vertical Display Enable End bit 9
(7)    Vertical Retrace Start bit 9
Preset Row Scan Register
Read/Write 3x5 Index 8
(0–4)  Starting scan row after Vertical Retrace
(5–6)  Byte Panning Control
       Used as extensions to PEL Panning Reg in multiple
       shift modes (no such mode is currently defined).
       Should be 00.
(7)    Reserved = 0
Maximum Scan Line Register
Read/Write 3x5 Index 9
(0–4)  Maximum Scan Line
(5)    Start Vertical Blank bit 9
(6)    Line Compare bit 9
(7)    Line Doubling (1)
       (counts Row counter every 2 lines)
Cursor Start Register
Read/Write 3x5 Index A
(0–4)  Cursor Start Row
(5)    Cursor Off (1)
(6–7)  Reserved = 0
Cursor End Register
Read/Write 3x5 Index B
(0–4)  Cursor End Row
(5–6)  Cursor Skew
(7)    Reserved = 0
Start Address High Register
Read/Write 3x5 Index C
(0–7)  High byte of Start Address
Start Address Low Register
Read/Write 3x5 Index D
(0–7)  Low byte of Start Address
Cursor Location High Register
Read/Write 3x5 Index E
(0–7)  High byte Cursor Location

CHART #1-continued

CRTC REGISTERS

Cursor Location High Register
Read/Write 3x5 Index F
(0–7)  High byte Cursor Location
Vertical Retrace Start Register
Read/Write 3x5 Index 10
(0–7)  Low order Vertical Retrace Start
Vertical Retrace End Register
Read/Write 3x5 Index 11
(0–3)  Vertical Retrace End
      VRS reg + width Vsync = 4 bit value
(4)  Clear Vertical Interrupt (0)
(5)  Enable Vertical Interrupt (0) IRQ2
(6)  Select 5 Refresh Cycles (1)
      (for slow horizontal rates)
(7)  Protect R0–R7 (1) (except R7 bit 4)
Vertical Display Enable End Register
Read/Write 3.5 Index 12
(0–7)  Low order Vertical Display Enable End
Offset Register
Read/Write 3x5 Index 13
(0–7)  Logical Line width off screen
      Word address of line to line offset
      (times 2 or 4)
Underline Location Register
Read/Write 3x5 Index 14
(0–4)  Underline Scan Line
(5)  Count by 4 (1)
      Memory address counter clocked by
      Character clock divided by 4
(6)  Double Word Mode (1)
(7)  Reserved = 0
Start Vertical Blanking Register

CHART #1-continued

CRTC REGISTERS

Read/Write 3/x5 Index 15
(7–0)  Low order byte Start Vertical Blanking
      Displayed Lines + borders - 1
End Vertical Blanking Register
Read/Write 3x5 Index 16
(0–7)  End Vertical Blanking
      SUB reg - 1 + width Vertical Blanking
CRTC Mode Control Register
Read/Write 3x5 Index 17
(0)  Compatibility Mode Support (0)
      ROW 0 —> MA13 for banks like CGA
(1)  Select Row Scan Counter (0)
      ROW 1 —> MA14 for banks like Hercules
(2)  Horizontal Retrace Select (1)
      Vertical counter clocked every 2 Lines
(3)  Count by 2 (1)
      Memory address clocked every 2 characters
(4)  Reserved = 0
(5)  Address Wrap
      MA13 on MA0 in word mode (0)
      MA15 on MA0 in word mode (1)
      (Use MA15 on MA0 since 256K mem)
(6)  Word/Byte Mode (0=word
      Word mode shifts address down 1 bit
      and MS bit appears on LS bit of MA.
(7)  Hardware Reset (0=Reset, 1-enabled)
Line Compare Register
Read/Write 3x5 Index 18
(0–7)  Low order of value to compare vertical counter for
      split screen.

CHART #2

| MODE SETTING 1ST TIMING | SCREEN 2ND TIMING | PIXEL CLOCK | NI* OR I** | SETTING # |
|---|---|---|---|---|
| 72.874 Hz | 37.967 KHz | 32.500 MHz | NI | #13 |
| 60.004 Hz | 35.403 KHz | 28.322 MHz | NI | #17 |
| Mode 5fh: | 640x48000, | 256 colors | | |
| 72,814 Hz | 37.791 KHz | 32.500 MHz | NI | #12 |
| 59.940 Hz | 31.469 KHz | 25.175 MHz | NI | #2 |
| Mode 58h: | 800x600, | 16 colors | | |
| 71.971 Hz | 48.077 KHz | 50.000 MHz | NI | #8 |
| 60.317 Hz | 37.879 KHz | 40.000 MHz | NI | #0 |
| 56.021 Hz | 35.461 KHz | 40.000 MHz | NI | #15 |
| Mode 5ch: | 800x600, | 256 colors | | |
| 71.971 Hz | 48.077 KHz | 50.000 MHz | NI | #10 |
| 56.021 Hz | 35.461 KHz | 40.000 MHz | NI | #16 |
| 60.317 Hz | 37.879 KHz | 40.000 MHz | Ni | #4 |
| Mode 5dh: | 1024x768, | 16 colors | | |
| 70.069 Hz | 56.476 KHz | 75.000 MHz | NI | #14 |
| 70.059 Hz | 56.818 KHz | 75.000 MHz | NI | #1 |
| 60.530 Hz | 48.363 KHz | 65.000 MHz | NI | #9 |
| 87.064 Hz | 35.522 KHz | 44.900 MHz | I | #3 |
| Mode 62h: | 1024x768, | 256 colors | | |
| 70.099 Hz | 56.991 KHz | 75.000 MHz | NI | #11 |
| 60.004 Hz | 48.363 KHz | 65.000 MHz | NI | #6 |
| 87.064 Hz | 35.522 KHz | 44.900 MHz | NI | #5 |
| Mode 6ah: | 1280x1024, | 256 colors | | |
| 60.024 Hz | 63.025 KHz | 90.000 MHz | NI | #107 |
| 86.938 Hz | 48.077 KHz | 75.000 MHz | NI | #7 |
| Mode 5eh: | 640x400, | 256 colors | | |
| 60.055 Hz | 31.469 KHz | 28.322 MHz | N | #20 |
| Mode 6ch: | 1280x1024, | 16 colors | | |
| 86.938 Hz | 48.077 KHz | 75.000 MHz | I | #67 |
| Mode 70h: | 640x480, | 32768 colors | | |
| 59.974 Hz | 31.486 KHz | 50.000 MHz | NI | 0100 |
| Mode 78h: | 640x480, | 65536 colors | | |
| 59.974 Hz | 31.486 KHz | 50.000 MHz | NI | #110 |
| Mode 71h: | 8000x600, | 32768 colors | | |
| 59.979 Hz | 38.986 KHz | 80.000 MHz | NI | #102 |
| 56.230 Hz | 36.550 KHz | 75.000 MHz | NI | #101 |

CHART #2-continued

| MODE SETTING 1ST TIMING | SCREEN 2ND TIMING | PIXEL CLOCK | NI* OR I** | SETTING # |
|---|---|---|---|---|
| Mode 70h: | 800x600, | 65536 colors | | |
| 59.979 Hz | 38.986 KHz | 80.000 MHz | NI | #112 |
| 56.230 Hz | 36.550 KHz | 75.000 MHz | NI | #111 |
| Mode 72h: | 1024x768, | 32768 colors | | |
| 84.902 Hz | 35.489 KHz | 90.000 MHz | I | #108 |
| Mode 7ah: | 1024x768, | 65536 colors | | |
| 84.902 Hz | 35.489 KHz | 90.000 MHz | I | #109 |

*NI = Non-Interlaced
**I = Interlaced

What is claimed is:

1. A method of verifying the functionality of a video card and a monitor that are installed in a computer having a device driver, wherein said device driver is adapted to selectively provide at least one mode to said video card for use with said monitor and said monitor is adapted to display video according to a plurality of modes, said method comprising the steps of:

(a) providing via a testing and set up tool, hereinafter referred to as Program that is stored in memory, an unverified list of modes to said video card according to a known compatible mode for display on said monitor to enable a user of said Program to view said unverified list and select a mode from said unverified list for testing on said monitor, wherein said unverified list of modes is stored in memory and in which said unverified list includes at least a first mode that is not compatible with at least one of said video card and said monitor, wherein said Program is used in determining whether or not said modes are compatible with at least one of said video card and said monitor;

(b) selecting said first mode presented from said unverified list;

(c) providing, via said Program, said first mode to said video card for display on said monitor to enable the user to check the screen of said monitor to determine if said first mode is compatible with said video card and said monitor;

(d) determining that said first mode is not compatible with at least one of said video card and said monitor by having the user evaluate the display of said monitor;

(e) providing, via said Program, in response to a determination of incompatibility, said unverified list of modes to said video card according to a known compatible mode for display on said monitor to enable the user of said Program to view said unverified list and select another mode from said unverified list for testing on said monitor;

(f) selecting a second mode from said unverified list, wherein said second mode is different from a known compatible mode;

(g) providing, via said Program, said second mode to said video card for display on said monitor to enable the user to check the screen of said monitor to determine if said second mode is compatible with said video card and said monitor, wherein said monitor in step (g) is the same monitor as used to display said known compatible mode in step (e);

(h) determining that said second mode is compatible with said video card and said monitor by having the user evaluate the display of said monitor; and (i) providing said second mode to said device driver for use with said video card and said monitor.

2. The method as claimed in claim 1 in which said providing step (a) is effected by:

(a-1) providing vertical and horizontal scan rates, and pixel clock rates, with the fastest of these named rates appearing generally at the top of said unverified list for each of said modes.

3. A method as claimed in claim 2 in which said selecting step (b) is effected by:

(b-1) selecting a setting number that is associated with a specific combination of said vertical scan rate, horizontal scan rate, and pixel clock rate for a particular mode.

4. The method as claimed in claim 1 in which said first mode provided to said video card in step (c) results in said monitor displaying from a group that includes at least one of a blank display, a fuzzy display, and jumping display so that information displayed on said monitor according to said first mode is substantially unrecognizable to the user.

5. A method of verifying the functionality of a video card and a monitor that are installed in a computer having a device driver, wherein said device driver is adapted to selectively provide at least one mode to said video card for use with said monitor and said monitor is adapted to display video according to a first plurality of modes, said method comprising the steps of:

(a) providing via a testing and set up tool, hereinafter referred to as Program that is stored in memory, an unverified list of modes to be selected by a user of said Program, wherein said unverified list of modes is stored in memory and in which said unverified list includes at least a first mode that is not compatible with at least one of said video card and said monitor, wherein said Program is used in determining whether or not said modes are compatible with at least one of said video card and said monitor;

(b) selecting said first mode from said unverified list;

(c) providing, via said Program, said first mode to said video card for display on said monitor to enable the user to check the screen of said monitor to determine if said first mode is compatible with said video card and said monitor;

(d) determining that said first mode is not compatible with at least one of said video card and said monitor by having the user evaluate the display of said monitor;

(e) providing, via said Program, in response to a determination that said first mode is not compatible, said unverified list of modes for selection by the user;

(f) selecting a second mode from said unverified list;

(g) providing, via said Program, said second mode to said video card for display on said monitor to enable the user to check the screen of said monitor to determine if said second mode is compatible with said monitor;

(h) determining that said second mode is compatible with said video card and said monitor;

(i) repeating steps (c) through (h) for additional modes to find a second plurality of modes which are compatible with the same said video card and said monitor;

(j) maintaining a verified list of said second plurality of modes which are compatible with said video card and said monitor and excluding from said verified list each mode that is determined as not being compatible with said video card and said monitor; and (k) providing said verified list to said device driver for use with said video card and said monitor.

6. The method as claimed in claim 5 in which said providing step (a) is effected by:

(a-1) providing:

vertical and horizontal scan rates, pixel clock rates, with the fastest of these named rates appearing generally at the top of said unverified list for each of said modes, a notation as to whether the monitor is interlaced or non-interlaced, and a setting number to facilitate selecting a mode presented on said unverified list of modes.

7. A method of verifying the functionality of a video card and a monitor that are installed in a computer having a device driver, wherein said device driver is adapted to selectively provide at least one mode to said video card for use with said monitor and said monitor is adapted to display video according to a plurality of modes, said method comprising the steps of:

(a) providing via a testing and set up tool, hereinafter referred to as Program that is stored in memory, an unverified list of modes that is stored in memory to said video card according to a known compatible mode for display on said monitor to enable a user of said Program to view said unverified list and select a mode from said unverified list for testing on said video card and said monitor, said unverified list including at least a first mode that is not compatible with at least one of said video card and said monitor;

(b) verifying which selections of said modes of said unverified list are compatible with said video card and said monitor by providing said modes that are selected by the user to said video card for display on said monitor and having the user evaluate the output of the screen of said monitor and activating a signal in said computer for each selection of a mode that is compatible with said video card and said monitor, wherein said providing step (a) is repeated in response to said first mode being verified as incompatible with at least one of said video card and said monitor;

(c) maintaining a verified list of the modes in response to said signal of step (b) which are verified as being compatible with said video card and said monitor and excluding from said verified list each mode that is determined as not being compatible with said video card and said monitor, wherein said monitor is the same monitor used for step (b); and (d) providing said verified list of modes to said device driver for use with said video card and said monitor.

8. The method as claimed in claim 7 in which said providing said verified list step (d) is effected by (d-1) generating a Command Line that is used in setting up the CONFIG.SYS file associated with said DOS operating system.

9. The method as claimed in claim 8 in which said providing step (a) is effected by:

(a-1) providing vertical and horizontal scan rates, and pixel clock rates, with the fastest of these named rates appearing generally at the top of said unverified list for each of said modes.

10. A system comprising:

a computer having a video card and a monitor adapted for displaying video according to a plurality of modes;

a device driver for maintaining a list of modes and to selectively provide at least first and second modes to said video card for use with said monitor;

a testing and setup tool, hereinafter referred to as Program that is stored in memory, for determining a verified list of a plurality of modes that are operative with said video card and said monitor, comprising means for providing an unverified list of modes to be selected by a user of said Program, said unverified list including at least said first mode that is not operable with at least one of said video card and said monitor;

entry means enabling the user to select said first mode from said unverified list for operation on said video card and said monitor;

wherein said Program further comprises:

means for providing said first mode to said video card and said monitor to enable the user to view said monitor to determine whether said first mode is operative for said video card and said monitor, means for receiving input indicative of whether said first mode is operative for said video card and said monitor, and in response to said input indicating said first mode is not operative with at least one of said video card and said monitor, activating said means for providing said unverified list to the same video card and said monitor so as to enable the user to select a different second mode for testing the operation on said video card and said monitor, said second mode being determined, using said Program, to be operative with said video card and said monitor, and means for maintaining a verified list of a plurality of modes including said second mode from said unverified list that are indicated by the user to be operable with said video card and said monitor and excluding from said verified list each mode that is determined as not being operative with said video card and said monitor.

11. The system as claimed in claim 10 wherein:

said video card comprises a video graphics adapter (VGA) card.

12. The system as claimed in claim 10 wherein:

said means, of said Program, for providing said first mode to said video card and said monitor results in said monitor displayiny from a group that includes at least one of a blank display, a fuzzy display, and a jumping display such that information displayed on said monitor according to said first mode is substantially unrecognizable to the user when said first mode in not operative with said video card and said monitor.

* * * * *